(12) United States Patent
Gratton et al.

(10) Patent No.: US 8,843,285 B2
(45) Date of Patent: Sep. 23, 2014

(54) OPERATOR SELECTABLE POWERTRAIN OPERATION CHARACTERISTICS FOR AN INFINITELY VARIABLE TRANSMISSION IN A WORK VEHICLE

(75) Inventors: Michael R. Gratton, Dubuque, IA (US); Eric R. Anderson, Galena, IL (US)

(73) Assignee: Deere + Company, Moline, IL (US)

( * ) Notice: Subject to any disclaimer, the term of this patent is extended or adjusted under 35 U.S.C. 154(b) by 105 days.

(21) Appl. No.: 13/426,812

(22) Filed: Mar. 22, 2012

(65) Prior Publication Data

US 2013/0253783 A1    Sep. 26, 2013

(51) Int. Cl.
*G06F 7/00* (2006.01)
*B60K 23/02* (2006.01)

(52) U.S. Cl.
USPC ........................................... 701/51; 74/473.3

(58) Field of Classification Search
USPC ............................................. 701/51; 477/34
See application file for complete search history.

(56) References Cited

U.S. PATENT DOCUMENTS 5,613,581 A * 3/1997 Fonkalsrud et al. ......... 192/3.23
7,108,096 B1 * 9/2006 Oxley et al. .................. 180/197

* cited by examiner

*Primary Examiner* — Yonel Beaulieu
(74) *Attorney, Agent, or Firm* — Taft Stettinius & Hollister, LLP; Stephen F. Rost

(57) ABSTRACT

An operator selectable transmission and method for a vehicle with variable drivetrain and torque control. The operator selectable transmission includes a plurality of transmission modes, each mode including a plurality of selectable contour relationships between vehicle ground speed and transmission rim-pull, an operator mode selector for selecting transmission mode, and an operator contour selector for selecting a contour for the selected mode. There can be hydrostatic, torque converter, direct drive and other transmission modes. An operator interface can display the currently selected mode, and its affects on performance, fuel consumption, and brake wear. The contour selector can be a foot pedal, hand lever or other device. The method includes reading a selected mode, contour and ground speed; determining a rim-pull command based on the readings; calculating a torque command for the transmission based on the rim-pull command and vehicle parameters; and sending the calculated torque command to the transmission.

20 Claims, 4 Drawing Sheets

OPERATOR SELECTABLE POWERTRAIN OPERATION CHARACTERISTICS FOR AN INFINITELY VARIABLE TRANSMISSION IN A WORK VEHICLE

FIELD OF THE INVENTION

The present invention generally relates to the field of infinitely variable transmissions and more specifically to operator selectable powertrain operation characteristics for an infinitely variable transmission with torque control.

BACKGROUND OF THE INVENTION

The drivetrain or powertrain refers to the group of components that generate power and deliver it to the road surface, which can include for example the engine, transmission, driveshafts, differentials, and the final drive (wheels, tracks, etc.). Due to the transmission or other components, the drivetrain limits available rim-pull (force available at the road surface) for a particular ground speed. Direct drive or torque converter machines have rim-pull limitations based upon the engine torque curve, efficiency losses, and other limitations due to having fixed discrete ratios between the engine and the wheels. An infinitely variable transmission can allow the engine to operate constantly at its peak power as it can operate effectively at an infinite number of gear ratios. This can enable expansion of the rim-pull performance beyond what is available in a conventional powertrain, although limits will still exist. A series electric powertrain is an example of a drivetrain that is both infinitely variable and has control of the rim-pull within the operating limits. This will be the exemplary drivetrain used for the rest of this application.

Work vehicles can operate in various environments, have various duties and have different operators with different preferences. For example, a loader may make countless maneuvers of getting a load of material from a pile, backing up from the pile, approaching a hauler, stopping and dumping the load in the hauler, backing up from the hauler, approaching the material pile and getting another load. This repetitive process requires constant forward, stop, reverse, stop movements which can cause excessive wear on service brakes of the vehicle if they are utilized and will affect how much energy is returned to the engine drive-shaft during deceleration thereby affecting total fuel consumption. Additionally, over the course of a day, operator fatigue can significantly affect overall productivity.

It would be desirable to have operator selectable characteristics for the powertrain to meet the operator preferences and/or to customize the characteristics to the job parameters. The comfort level for each operator may be determined by the particular type of powertrain they frequently operate on other machines, for example hydrostatic transmissions, torque converter transmissions, or direct drive transmissions. It would also be desirable to have the transmission help in the braking process to reduce the amount of braking the operator needs to do with the service brakes, thus extending the life of the service brakes and improving fuel economy. Allowing the operator to select operating modes that result in more transmission braking provides more kinetic energy to power other vehicle loads and reduce/eliminate engine fueling. By enabling operator selectable feel, the operator can determine what transmission characteristic is most comfortable to them and the most appropriate for the job.

SUMMARY

An operator selectable transmission is disclosed for a vehicle that has a variable drivetrain with torque control under control of an operator. The operator selectable transmission includes a plurality of transmission modes, a mode selector and a contour selector. Each transmission mode includes a plurality of selectable contour relationships between vehicle ground speed and transmission rim-pull. The mode selector is controlled by the operator to select a desired transmission mode from the plurality of transmission modes. The contour selector is controlled by the operator to select a desired contour relationship from the plurality of selectable contour relationships for the selected transmission mode. The mode selector can enable operator selection between the plurality of transmission modes while the vehicle is operating.

The plurality of transmission modes can include a hydrostatic mode replicating a hydrostatic transmission and a torque converter mode replicating a torque converter transmission. The plurality of transmission modes can also include a plurality of middle modes between the hydrostatic mode and the torque converter mode, each of the middle modes including a unique mixture of characteristics of a hydrostatic transmission and a torque converter transmission. The plurality of transmission modes can also include a direct drive mode replicating a direct drive transmission.

The operator selectable transmission can also include an operator interface displaying the currently selected transmission mode to the operator. The operator interface can also display affects on performance, fuel consumption, and brake wear to the operator of the currently selected transmission mode.

The contour selector can be a foot pedal. The plurality of selectable contours can range from a 0% contour to a 100% contour, the operator not depressing the foot pedal to select the 0% contour and the operator fully depressing the foot pedal to select the 100% contour. Alternatively, the contour selector can be a hand lever.

The plurality of selectable contour relationships for each of the plurality of transmission modes can range from a 0% contour to a 100% contour, and the contour selector can range from 0% operator activation for selecting the 0% contour to 100% operator activation for selecting the 100% contour. The plurality of transmission modes can include a hydrostatic mode replicating a hydrostatic transmission having a high resistance to motion in the opposite direction of which the vehicle is commanded. When the 0% contour for the hydrostatic mode is selected, the transmission can try to bring the vehicle to zero ground speed. The plurality of selectable contour relationships for the hydrostatic mode can include rapid rim-pull deceleration in the opposite direction of vehicle motion. The plurality of transmission modes can include a torque converter mode replicating a torque converter transmission. When the 0% contour for the torque converter mode is selected, the transmission can try to bring the vehicle to a constant forward ground speed.

An operator selectable transmission method is disclosed for a vehicle with a variable drivetrain with torque control. The operator selectable transmission method includes reading a selected transmission mode by a controller, the selected transmission mode being selected by an operator from a plurality of transmission modes; reading a ground speed of the vehicle by the controller; reading a selected relationship contour by the controller, the selected relationship contour being selected by the operator from a plurality of relationship contours, each relationship contour defining a relationship between vehicle ground speed and transmission rim-pull for the selected transmission mode; determining a rim-pull command by the controller based on the selected transmission mode, the ground speed of the vehicle, and the selected relationship contour; calculating a torque command for the transmission based on the rim-pull command and vehicle parameters; and sending the calculated torque command to the transmission. Reading a selected relationship contour can include determining the position of an operator activation selector ranging between 0% and 100%. Reading a selected transmission mode can include determining the position of a switch having: a first position for selecting a transmission mode replicating a hydrostatic transmission, a second position for selecting a transmission mode replicating a mixture of characteristics of hydrostatic and torque converter transmissions more resembling a hydrostatic transmission, a third position for selecting a transmission mode replicating a mixture of characteristics of hydrostatic and torque converter transmissions more resembling a torque converter transmission, and a fourth position for selecting a transmission mode replicating a torque converter transmission.

DETAILED DESCRIPTION

Figure 1:
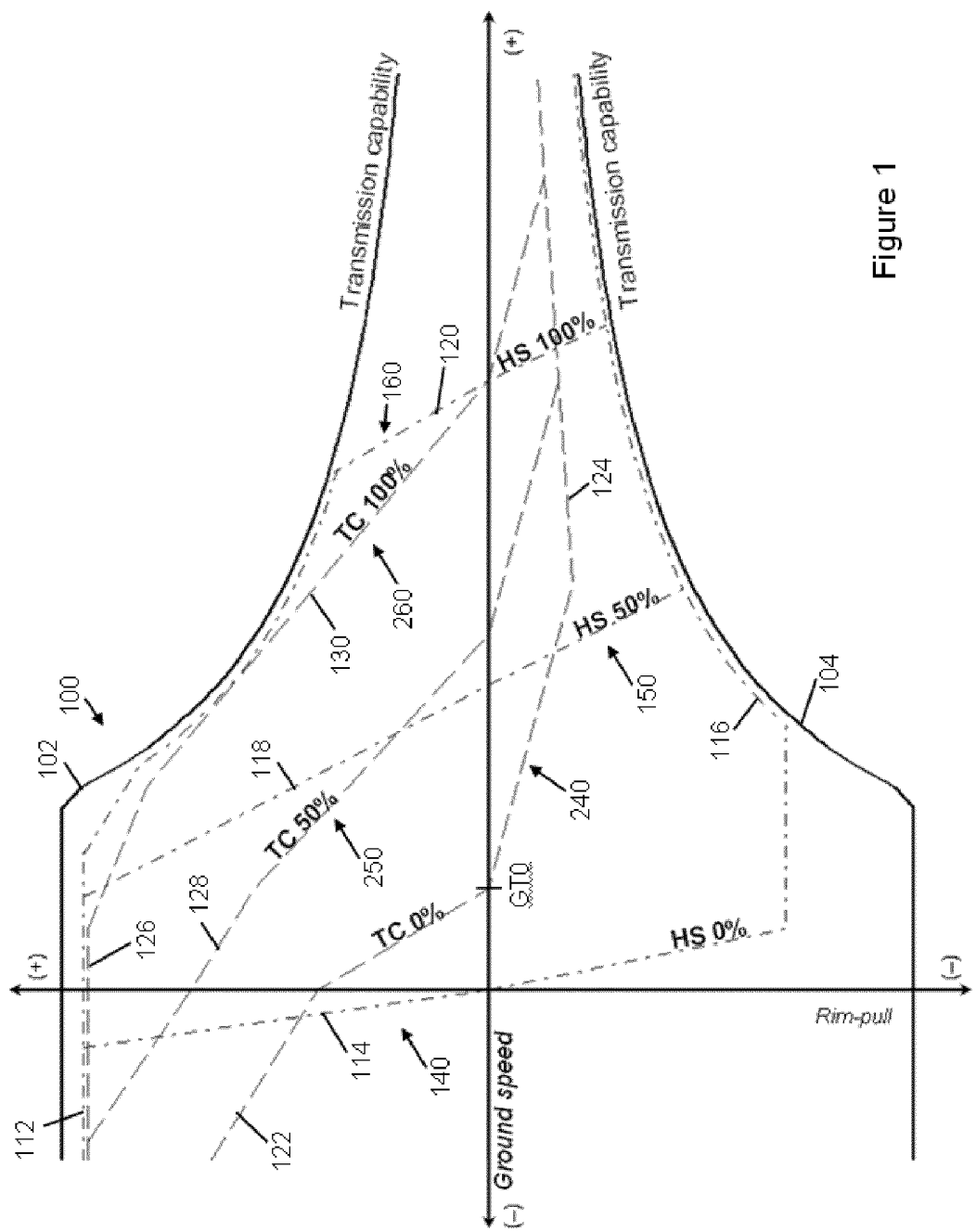
FIG. 1 shows a diagram of ground speed versus rim-pull for a pair of exemplary operator selectable powertrain operation characteristics for an electric drivetrain.

For the purposes of promoting an understanding of the principles of the novel invention, reference will now be made to the embodiments described herein and illustrated in the drawings and specific language will be used to describe the same. It will nevertheless be understood that no limitation of the scope of the novel invention is thereby intended, such alterations and further modifications in the illustrated devices and methods, and such further applications of the principles of the novel invention as illustrated therein being contemplated as would normally occur to one skilled in the art to which the novel invention relates.

Operator selectable powertrain operation characteristics for an electric drivetrain can enable operator selection of a preferred set of powertrain operation characteristics from a plurality of selectable powertrain profiles. The operator can select the desired powertrain characteristics or profile based on personal preferences, job requirements for use of the vehicle, or for other reasons. Different powertrain characteristics will change the rim-pull by the powertrain which affects the braking action of the powertrain and can reduce the braking required by the service brakes of the vehicle.

FIG. 1 shows a diagram of ground speed versus rim-pull for a pair of exemplary operator selectable powertrain operation characteristics for an electric drivetrain. Ground speed is shown on the X-axis with a positive ground speed indicating that the vehicle is traveling in the same direction as commanded, and a negative ground speed indicating that the vehicle is traveling in the opposite direction as commanded which could be due to sitting on an upward slope. Rim-pull, force applied to the ground surface, is shown on the Y-axis. An acceleration command is when rim-pull has the same sign as ground speed, and a deceleration command is when rim-pull has the opposite sign as ground speed. Thus, (+) speed *(+) rim-pull=acceleration command; (−) speed*(−) rim-pull=acceleration command; (+) speed*(−) rim-pull=deceleration command; and (−) speed*(+) rim-pull=deceleration command.

FIG. 1 shows an envelope formed by the transmission capability, a first exemplary transmission profile resembling a hydrostatic transmission, and a second exemplary transmission profile resembling a torque converter transmission. The transmission capability envelope 100 is formed by an upper bound 102 and a lower bound 104. Note that the upper and lower bounds 102, 104 extend to the left of the diagram and generally form a mirror image capability envelope (not shown) sloping down towards to X-axis on the negative ground speed side. All of the transmission profiles fall within this capability envelope.

Each of the two exemplary transmission profiles includes a plurality of contours, each contour defining a relationship between rim-pull and ground speed. The operator selects a desired contour from the plurality of contours through an input device. The input device for contour selection can be a foot pedal, a hand lever, a dial or other appropriate selection device. The contours for 0% activation, 50% activation and 100% activation of the input device are shown in FIG. 1 for each of the two exemplary transmission profiles. The contours for each of the exemplary transmission profiles will now be described going from left to right across the diagram of FIG. 1.

The exemplary hydrostatic transmission profile includes a 0% activation hydrostatic contour 140, a 50% activation hydrostatic contour 150, and a 100% activation hydrostatic contour 160. The 0% activation hydrostatic contour 140 starts along upper hydrostatic rim-pull curve 112 which is near the upper envelope bound 102, proceeds down along the hydrostatic 0% curve 114 and continues along lower hydrostatic rim-pull curve 116 which is near the lower envelope bound 104. The 50% activation hydrostatic contour 150 starts along the upper hydrostatic rim-pull curve 112 which is near the upper envelope bound 102, proceeds down along the hydrostatic 50% curve 118 and continues to the right along the lower hydrostatic rim-pull curve 116 which is near the lower envelope bound 104. The 100% activation hydrostatic contour 160 starts along the upper hydrostatic rim-pull curve 112 which is near the upper envelope bound 102, proceeds down along the hydrostatic 100% curve 120 and continues to the right along the lower hydrostatic rim-pull curve 116 which is near the lower envelope bound 104.

The exemplary torque converter transmission profile includes a 0% activation torque converter contour 240, a 50% activation torque converter contour 250, and a 100% activation torque converter contour 260. The 0% activation torque converter contour 240 starts to the left of the diagram near the upper envelope bound 102 (not shown), proceeds down along the torque converter 0% curve 122 and continues along lower torque converter rim-pull curve 124. The 50% activation torque converter contour 250 starts along the upper torque converter rim-pull curve 126 which is near the upper envelope bound 102, proceeds down along the torque converter 50% curve 128 and continues to the right along the lower torque converter rim-pull curve 124. The 100% activation torque converter contour 260 starts along the upper torque converter rim-pull curve 126 which is near the upper envelope bound 102, proceeds down along the torque converter 100% curve 130 and continues to the right along the lower torque converter rim-pull curve 124.

The hydrostatic and torque converter transmission profiles are exemplary and there could be any number of different operator selectable transmission profiles that fit within the transmission capability envelope 100. The 0%, 50% and 100% contours are just three examples of contours for different amounts of operator activation. The operator can position the contour selection input device anywhere between 0% and 100% activation moving the transmission characteristics between different contours.

The operation of the operator selectable powertrain operation characteristics can be viewed as having three inputs and an output. The three inputs can be viewed as: (1) operator selected transmission mode (e.g., hydrostatic, torque converter or direct drive), (2) operator selected contour relationship between rim-pull and ground speed (e.g., 0%, 50% or 100%), and (3) ground speed. The first two inputs select a specific contour such as one of those shown in FIG. 1 and the third input selects an X-coordinate for a point on the selected contour. The output can be viewed as a rim-pull command which is the Y-coordinate corresponding to the selected X-coordinate of the point on the selected contour. The rim-pull (force) command is translated by the controller into a transmission torque command. The computation translating the rim-pull command into a transmission torque command takes into account various vehicle parameters, for example the wheel (or track) radius of the vehicle, and any gear ratios that exist between the motor(s) and the wheel, including axle and/or transmission reductions.

FIG. 1 shows that for the hydrostatic transmission profile and 0% operator activation, there is zero rim-pull at zero ground speed. In contrast, for the torque converter transmission profile and 0% operator activation, at zero rim-pull there is a ground speed of GT0. Thus, on level ground with no pressure on the foot pedal, the vehicle will travel at a defined speed GT0 in torque converter mode and will not move in hydrostatic mode.

Figure 2:
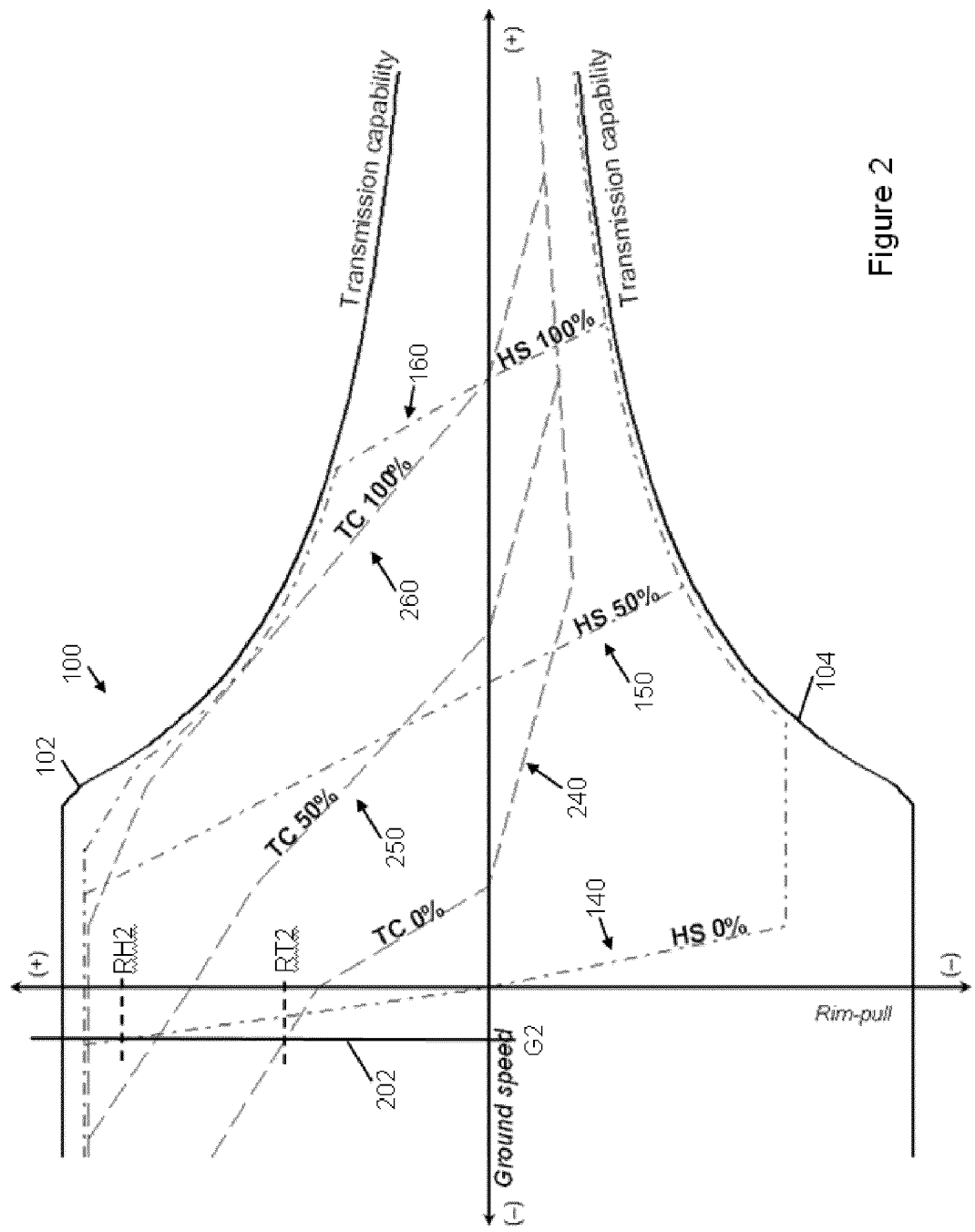
FIG. 2 shows the diagram of FIG. 1 in a negative ground speed condition.

FIG. 2 shows the same diagram as FIG. 1 overlaid with a line 202 showing the vehicle rolling backwards with a negative ground speed G2. For ground speed G2 with the torque converter transmission mode selected and 0% operator activation, the electronic transmission provides a rim-pull of RT2. For ground speed G2 with the hydrostatic transmission mode selected and 0% operator activation, the electronic transmission provides a rim-pull of RH2. This shows that for these contours, the hydrostatic profile provides much more rim-pull resistance in the opposite direction of vehicle motion. Thus, the operator would not need to use the service brakes as much to stop the motion of the vehicle when the hydrostatic transmission mode is selected as when the torque converter transmission mode is selected.

Figure 3:
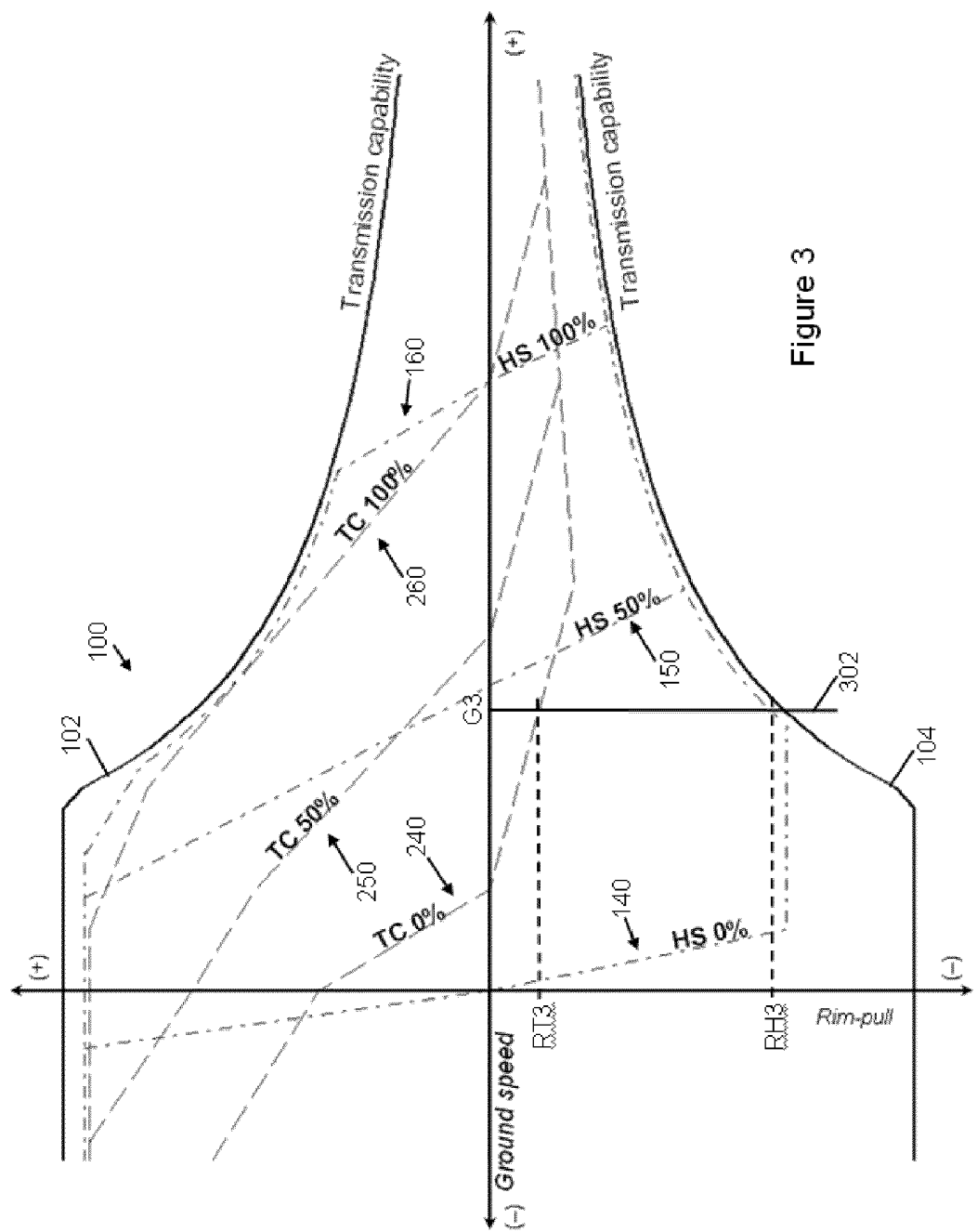
FIG. 3 shows the diagram of FIG. 1 in a positive ground speed condition.

FIG. 3 shows the same diagram as FIG. 1 overlaid with a line 302 showing the vehicle going forwards with a ground speed G3. Suppose while going at speed G3, the operator lets off the activation input to 0% operator activation. For ground speed G3 with torque converter mode selected and 0% operator activation, the electronic transmission provides a rim-pull of RT3. For ground speed G3 with the hydrostatic mode selected and 0% operator activation, the electronic transmission provides a rim-pull of RH3. The hydrostatic mode results in much more negative rim-pull than the torque converter mode which provides much more aggressive deceleration from G3 to zero ground speed than the torque converter setting. This reduces brake wear and fuel consumption of the vehicle. In the example of the loader making repeated forward, stop, reverse, stop maneuvers to load a hauler, the operator would need to use less service brakes when approaching the hauler in hydrostatic mode than in torque converter mode.

Referring again to FIG. 1, if the operator continues with 0% operator activation without applying any brakes on level ground, the hydrostatic mode will bring the vehicle to a stop (zero ground speed) while the torque converter will bring the vehicle to the slower but constant speed of GT0. Thus, stopping the vehicle on level ground in torque converter mode will require some amount of use of the service brakes.

Figure 4:
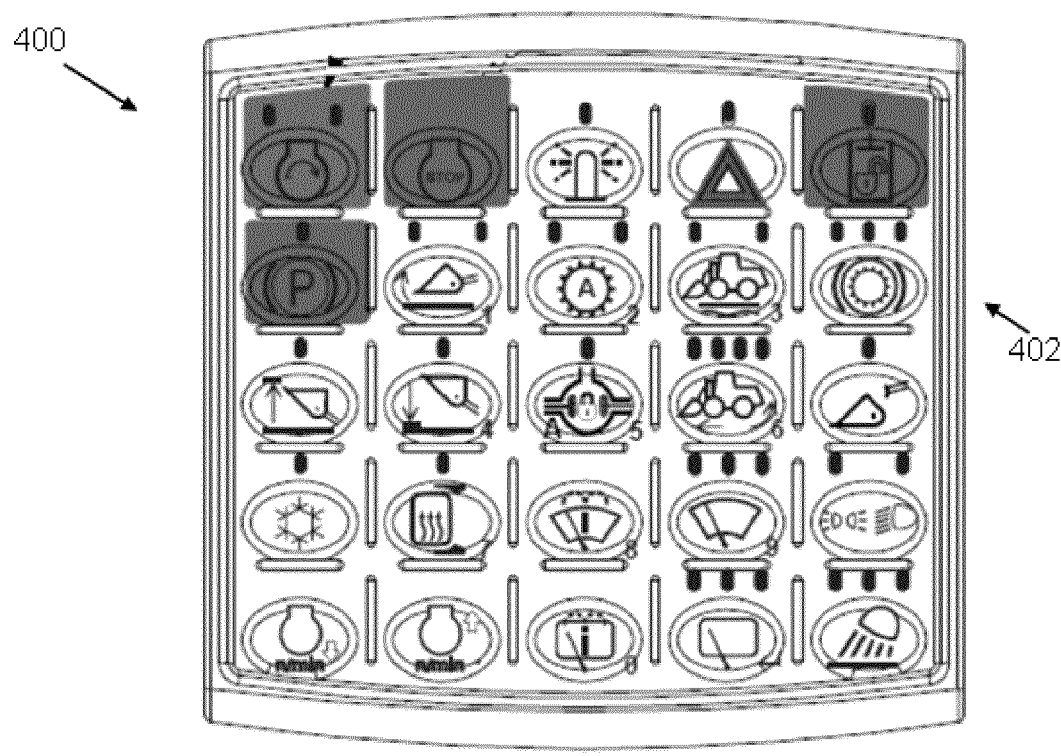
FIG. 4 shows an exemplary operator control panel.
Figure 5:
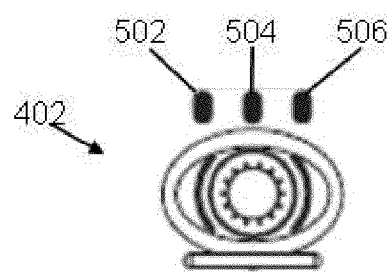
FIG. 5 shows an exemplary control panel display for operator selectable powertrain operation characteristics for an electric drivetrain.

FIG. 4 shows an exemplary operator control panel 400 with various selectors to control various systems on the vehicle including an exemplary selector 402 for powertrain operation characteristics. FIG. 5 shows the exemplary selector 402 for powertrain operation characteristics. The exemplary selector 402 for powertrain operation characteristics includes a symbol and three indicator lights 502, 504, 506 indicating the currently selected powertrain operation characteristics. In one embodiment, no lights illuminated means torque converter mode is selected, only the light 502 illuminated means a middle mode with more torque converter characteristics than hydrostatic characteristics is selected; only the lights 502 and 504 illuminated means a middle mode with more hydrostatic characteristics than torque converter characteristics is selected, and all the lights 502, 504 and 506 illuminated means hydrostatic mode is selected. There can be more or less than four transmission modes, and different types of transmission mode selectors with different mode indicators can be used in different embodiments. The exemplary selector 402 for powertrain operation characteristics or other displays available to the operator can display the affects of the currently selected transmission mode on performance, fuel consumption, and/or brake wear.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains.

We claim:

1. An operator selectable transmission for a vehicle with a variable drivetrain with torque control under control of an operator, the operator selectable transmission comprising:
   a plurality of transmission modes, each transmission mode comprising a plurality of selectable contour relationships between vehicle ground speed and transmission rim-pull;
   a mode selector controlled by the operator for selection of a selected transmission mode from the plurality of transmission modes; and
   a contour selector controlled by the operator for selection of a selected contour relationship from the plurality of selectable contour relationships for the selected transmission mode.

2. The operator selectable transmission of claim 1, wherein the plurality of transmission modes comprises a hydrostatic mode replicating a hydrostatic transmission and a torque converter mode replicating a torque converter transmission.

3. The operator selectable transmission of claim 2, wherein the plurality of transmission modes further comprises a plurality of middle modes between the hydrostatic mode and the torque converter mode, each of the middle modes including a unique mixture of characteristics of a hydrostatic transmission and a torque converter transmission.

4. The operator selectable transmission of claim 2, wherein the plurality of transmission modes further comprises a direct drive mode replicating a direct drive transmission.

5. The operator selectable transmission of claim 1, wherein the mode selector enables operator selection between the plurality of transmission modes while the vehicle is operating.

6. The operator selectable transmission of claim 1, further comprising an operator interface displaying to the operator the currently selected transmission mode of the plurality of transmission modes.

7. The operator selectable transmission of claim 6, wherein the operator interface further displays affects on performance, fuel consumption, and brake wear to the operator of the currently selected transmission mode.

8. The operator selectable transmission of claim 6, wherein the contour selector is a foot pedal.

9. The operator selectable transmission of claim 8, wherein the plurality of selectable contours range from a 0% contour to a 100% contour, the operator not depressing the foot pedal to select the 0% contour and the operator fully depressing the foot pedal to select the 100% contour.

10. The operator selectable transmission of claim 1, wherein the contour selector is a foot pedal, and wherein the plurality of selectable contours range from a 0% contour to a 100% contour, the operator not depressing the foot pedal to select the 0% contour and the operator fully depressing the foot pedal to select the 100% contour.

11. The operator selectable transmission of claim 1, wherein the contour selector is a hand lever.

12. The operator selectable transmission of claim 1, wherein the plurality of selectable contour relationships for each of the plurality of transmission modes range from a 0% contour to a 100% contour, and the contour selector ranges from 0% operator activation for selecting the 0% contour to 100% operator activation for selecting the 100% contour.

13. The operator selectable transmission of claim 12, wherein the plurality of transmission modes includes a hydrostatic mode replicating a hydrostatic transmission having a high resistance to motion in the opposite direction to which the vehicle is commanded.

14. The operator selectable transmission of claim 13, wherein when the 0% contour for the hydrostatic mode is selected, the transmission tries to bring the vehicle to zero ground speed.

15. The operator selectable transmission of claim 14, wherein the plurality of selectable contour relationships for the hydrostatic mode includes rapid rim-pull deceleration in the opposite direction of vehicle motion.

16. The operator selectable transmission of claim 12, wherein the plurality of transmission modes includes a torque converter mode replicating a torque converter transmission.

17. The operator selectable transmission of claim 16, wherein when the 0% contour for the torque converter mode is selected, the transmission tries to bring the vehicle to a constant forward ground speed.

18. An operator selectable transmission method for a vehicle with a variable drivetrain with torque control, the method comprising:
   reading a selected transmission mode by a controller, the selected transmission mode being selected by an operator from a plurality of transmission modes;
   reading a ground speed of the vehicle by the controller;
   reading a selected relationship contour by the controller, the selected relationship contour being selected by the operator from a plurality of relationship contours, each relationship contour defining a relationship between vehicle ground speed and transmission rim-pull for the selected transmission mode;
   determining a rim-pull command by the controller based on the selected transmission mode, the ground speed of the vehicle, and the selected relationship contour;
   calculating a torque command for the transmission based on the rim-pull command and vehicle parameters; and
   sending the calculated torque command to the transmission.

19. The operator selectable transmission method of claim 18, wherein reading a selected relationship contour comprises determining the position of an operator activation selector ranging between 0% and 100%.

20. The operator selectable transmission method of claim 19, wherein reading a selected transmission mode comprises determining the position of a switch having:
   a first position for selecting a transmission mode replicating a hydrostatic transmission;
   a second position for selecting a transmission mode replicating a mixture of characteristics of hydrostatic and torque converter transmissions more resembling a hydrostatic transmission;
   a third position for selecting a transmission mode replicating a mixture of characteristics of hydrostatic and torque converter transmissions more resembling a torque converter transmission; and
   a fourth position for selecting a transmission mode replicating a torque converter transmission.

\* \* \* \* \*